US011195070B2

(12) United States Patent
Tanaka

(10) Patent No.: US 11,195,070 B2
(45) Date of Patent: Dec. 7, 2021

(54) INFORMATION PROCESSING APPARATUS AND METHOD FOR GENERATING PRINT DATA BASED ON A 2-IN-1 PRINT INSTRUCTION

(71) Applicant: CANON KABUSHIKI KAISHA, Tokyo (JP)

(72) Inventor: Yosuke Tanaka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/721,572

(22) Filed: Dec. 19, 2019

(65) Prior Publication Data

US 2020/0210793 A1 Jul. 2, 2020

(30) Foreign Application Priority Data

Dec. 28, 2018 (JP) .............................. JP2018-247847

(51) Int. Cl.
*G06K 15/02* (2006.01)
*G06F 3/12* (2006.01)

(52) U.S. Cl.
CPC ....... *G06K 15/1885* (2013.01); *G06F 3/1227* (2013.01); *G06F 3/1258* (2013.01); *G06F 3/1298* (2013.01)

(58) Field of Classification Search
None
See application file for complete search history.

(56) References Cited

U.S. PATENT DOCUMENTS

| 2003/0202831 | A1* | 10/2003 | Matsunaga | .......... | B41J 13/0027 |
| | | | | | 400/76 |
| 2005/0105118 | A1* | 5/2005 | Yoshida | ................ | G06F 3/1285 |
| | | | | | 358/1.13 |
| 2007/0201091 | A1* | 8/2007 | Tanaka | .................. | G06F 3/1285 |
| | | | | | 358/1.16 |
| 2013/0194601 | A1* | 8/2013 | Nakagawa | ............ | G06F 3/1285 |
| | | | | | 358/1.13 |

FOREIGN PATENT DOCUMENTS

JP 2005-182694 A 7/2005

\* cited by examiner

*Primary Examiner* — Andrew H Lam
(74) *Attorney, Agent, or Firm* — Canon U.S.A., Inc. I.P. Division

(57) ABSTRACT

A print processor is provided and executes layout processing excluding reduction processing in accordance with at least a determination that a print setting causing the reduction processing is made as a print setting, and notifies a printer driver of information about the layout processing excluding the reduction processing. The printer driver scales, upon reception of the information about the layout processing excluding the reduction processing from the print processor, rendering data subjected to the layout processing excluding the reduction processing by the print processor based on a parameter included in the notified information, and generates print data to be transmitted to a printing apparatus, based on the scaled rendering data.

5 Claims, 8 Drawing Sheets

FIG.4

PRINT PROPERTIES FOR PRINTING APPARATUS

NUMBER OF COPIES (Q): 1 COPIES (1 - 9999)

PRINT ORIENTATION (O): ● PORTRAIT ○ LANDSCAPE

DOCUMENT SIZE (S): A4

OUTPUT DOCUMENT SIZE (Z): SIZE EQUAL TO DOCUMENT SIZE — 404
— 403

ARRANGEMENT ORDER (D): FROM LEFT TO RIGHT

PAGE LAYOUT (Y): 2 in 1 — 401

SINGLE-SIDED/DOUBLE-SIDED/BOOKBINDING (T): DOUBLE-SIDED PRINTING — 402

BOOKBINDING DETAILS (K)...

BINDING DIRECTION (B): LONG-SIDE BINDING (TOP)

BINDING MARGIN (U)...

STAPLING/SORTING/GROUPING (H): SORTING

DESIGNATE STAPLE POSITION (L)...

COLOR MODE (C): AUTOMATIC (COLOR/BLACK-AND-WHITE)

SET NUMBER OF COLORS (E)...

A4 (MAGNIFICATION: AUTOMATIC)

CHECK SETTINGS (V)

RESTORE DEFAULTS (R)

OK  CANCEL  HELP

1st Page

| 1 | 0 | 15 |
|---|---|----|
| 2 | 3 | 7 |
| 3 | 12 | 10 |
| 4 | 7 | 9 |

602

2nd Page

| 5 | 1 | 19 |
|---|---|----|
| 6 | 8 | 4 |
| 7 | 13 | 14 |
|   |   |    |

603

610

| 1st Page | | | 2nd Page | | |
|---|---|---|---|---|---|
| 1 | 0 | 15 | 5 | 1 | 19 |
| 2 | 3 | 7 | 6 | 8 | 4 |
| 3 | 12 | 10 | 7 | 13 | 14 |
| 4 | 7 | 9 | | | |

INFORMATION PROCESSING APPARATUS AND METHOD FOR GENERATING PRINT DATA BASED ON A 2-IN-1 PRINT INSTRUCTION

BACKGROUND

Field

The present disclosure relates to an information processing apparatus that generates print data.

Description of the Related Art

Information processing apparatuses that provide a printer with print data for executing printing have been known. For example, an information processing apparatus discussed in Japanese Patent Application Laid-Open No. 2005-182694 converts document data into print data (page description language (PDL) data) using a printer driver and a print processor, which is a preprocess module for the printer driver. In an information processing apparatus discussed in Japanese Patent Application Laid-Open No. 2005-182694, the print processor generates a rendering instruction based on a print setting made by a user and document data, and the printer driver converts the rendering instruction into print data that can be printed by a printer. For example, when 2-in-1 printing is set as a print setting, the print processor operates in cooperation with a graphic device interface (GDI) to execute layout processing for laying out two logical pages on one page and converting the logical pages into one piece of rendering data. The print processor can operate in cooperation with the GDI to render enlarged or reduced rendering data to fit the rendering data in the size of a sheet.

In a case of generating rendering data involving reduction processing on logical pages using the above described print processor and GDI, there arises an issue that a graphics object is not rendered if a width of the graphics object becomes less than a predetermined size as a result of the reduction processing.

Specifically, for example, when N-in-1 printing is set for allocation of a plurality of logical pages to one page, reduction processing may be performed on the logical pages when rendering data is reduced to the size of a sheet, or when bookbinding printing is set. If a graphics object is lost from rendering data generated by the print processor and the GDI operating in cooperation with each other, PDL data that does not include the graphics object is generated by the subsequent-stage printer driver. As a result, there arises an issue that a print product different from that intended by a user is generated.

SUMMARY

According to an aspect of the present disclosure, an information processing apparatus includes at least one memory storing instructions, and at least one processor that, upon execution of the instructions, configures the at least one processor to operate as a print processor and a printer driver, wherein the print processor executes layout processing excluding reduction processing in accordance with at least a determination that a print setting causing the reduction processing is made based on the print setting corresponding to rendering data, the rendering data being output from an application and used for printing, and notifies the printer driver of information about the layout processing excluding the reduction processing, and wherein the printer driver scales, upon reception of the information about the layout processing excluding the reduction processing, the rendering data subjected to the layout processing excluding the reduction processing by the print processor, based on a parameter included in the notified information, and generates print data to be transmitted to a printing apparatus based on the rendering data scaled by the scaling unit, and scales the rendering data without reducing a width of a graphics object included in the rendering data subjected to the layout processing excluding the reduction processing to a width less than or equal to a predetermined value.

Further features of the present disclosure will become apparent from the following description of exemplary embodiments with reference to the attached drawings.

BRIEF DESCRIPTION OF THE DRAWINGS

FIG. 4 is a diagram illustrating an example of a print setting screen to be displayed on an operation unit.

FIG. 6 is a schematic diagram illustrating a loss of a graphics object.

DESCRIPTION OF THE EMBODIMENTS

Exemplary embodiments for carrying out the present disclosure will be described below with reference to the accompanying drawings. The following exemplary embodiments are not meant to limit the scope of the present disclosure as encompassed by the appended claims. Further, not all combinations of features described in the exemplary embodiments are essential for solving means of the present disclosure.

Figure 1:
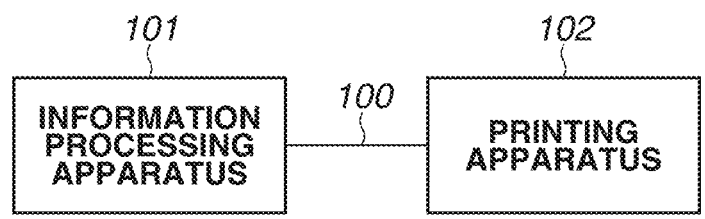
FIG. 1 is a diagram illustrating an outline of a printing system.

First, an exemplary configuration of a printing system according to a first embodiment of the present disclosure will be described with reference to FIG. 1. The printing system according to the present exemplary embodiment includes an information processing apparatus 101 and a printing apparatus 102.

The information processing apparatus 101 is connected to the printing apparatus 102 via a communication interface such as a universal serial bus (USB) to communicate with each other.

While the present exemplary embodiment illustrates a configuration in which the information processing apparatus 101 and the printing apparatus 102 are connected via a USB cable 100, the configuration according to the present exemplary embodiment is not limited to this example. The information processing apparatus 101 and the printing apparatus 102 may be connected via a network cable, or may be connected by wireless communication based on the Institute of Electrical and Electronics Engineers (IEEE) 802.11 standard (hereinafter referred to as the 802.11 standard) via an access point (not illustrated), to communicate with each other. Alternatively, the information processing apparatus 101 and the printing apparatus 102 may be connected by ad hoc communication such as Wi-Fi Direct® to communicate with each other.

The information processing apparatus 101 includes a function for generating print data (page description language (PDL) data) to be transmitted to the printing apparatus 102. The print data generated by the information processing apparatus 101 is transmitted to the printing apparatus 102. In the present exemplary embodiment, a personal computer (PC), a tablet terminal, or the like in which a printer driver is installed is used as an example of the information processing apparatus 101. However, the information processing apparatus 101 is not limited to these examples.

The printing apparatus 102 includes a print function for receiving print data from a host terminal, such as the information processing apparatus 101, and printing an image on a sheet, such as paper, based on the print data. The present exemplary embodiment illustrates a case where a single function peripheral (SFP) including a print function is used as an example the printing apparatus 102. However, the printing apparatus 102 is not limited this example. The printing apparatus 102 may be a multi-function peripheral (MFP) including a scan function, a copy function, and the like in addition to the print function.

<Information Processing Apparatus>

Figure 2:
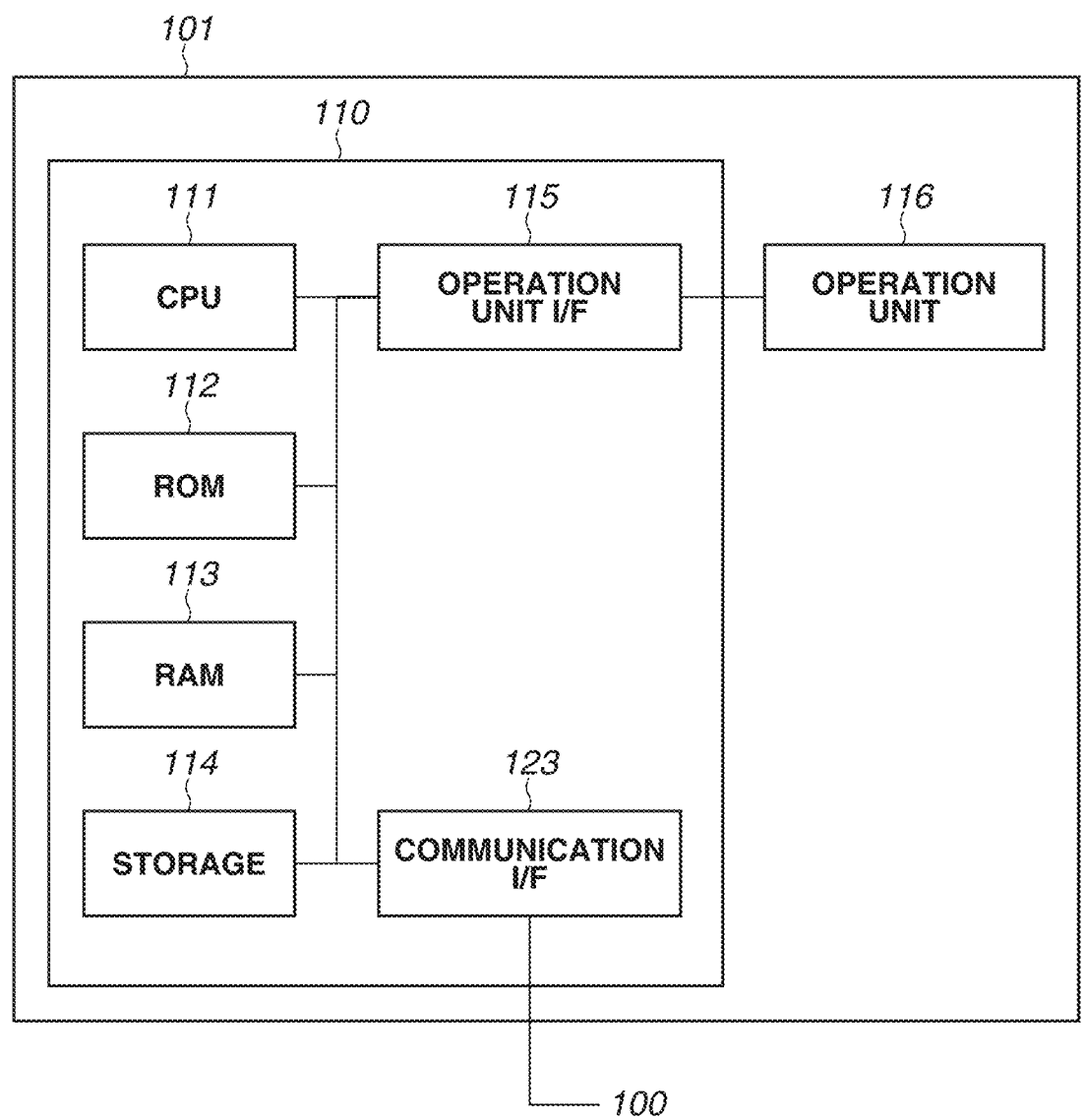
FIG. 2 is a block diagram illustrating a hardware configuration example of an information processing apparatus.

A hardware configuration example of the information processing apparatus 101 will be described with reference to FIG. 2. A central processing unit (CPU) 111 included in a control unit 110 reads out control programs stored in a read-only memory (ROM) 112 or a storage 114 and controls the information processing apparatus 101 based on the control programs.

The control unit 110 includes the CPU 111, the ROM 112, a random access memory (RAM) 113, the storage 114, and an operation unit interface (I/F) 115, which are connected to a bus. The control unit 110 also includes a communication I/F 123 for communicating with a peripheral apparatus such as the printing apparatus 102.

The CPU 111 is a central processing unit (processor) that controls the overall operation of the control unit 110. The RAM 113 is a volatile memory and is used as a work area or a temporary storage area for loading various control programs stored in the ROM 112 and the storage 114.

The ROM 112 is a nonvolatile memory and stores a boot program and the like for the information processing apparatus 101. The storage 114 is a nonvolatile flash memory having a capacity larger than that of the RAM 113. The storage 114 stores control programs for the information processing apparatus 101. An operating system (OS) 300, an application 200, a printer driver 500, and a print processor 400, which are described below, are also stored in the storage 114.

The CPU 111 executes the boot program stored in the ROM 112 at start-up of the information processing apparatus 101. This boot program is used to read out a program for the OS 300 stored in the storage 114 and to load the program into the RAM 113. After executing the boot program, the CPU 11 subsequently executes the program for the OS 300 loaded into the RAM 113, to thereby control the information processing apparatus 101. Further, the CPU 111 stores data to be used for operations based on control programs in the RAM 113, and reads and writes the data.

While the information processing apparatus 101 has a configuration in which a single CPU 111 executes each process illustrated in flowcharts to be described below, the information processing apparatus 101 may have another configuration. For example, the information processing apparatus 101 may have a configuration in which a plurality of CPUs or microprocessors (MPUs) operates in cooperation with each other to execute each process illustrated in the flowcharts to be described below. In the present exemplary embodiment, some of the processes are implemented in cooperation with each I/F and each unit.

The operation unit L/F 115 connects the control unit 110 and an operation unit 116 to each other. The operation unit 116 includes a display device that displays various screens, and an input device that receives a user operation. Examples of the input device include a mouse and a keyboard. In the case of using a tablet terminal, a touch panel display functions as both the display device and the input device. The operation unit 116 including the display device and the input device functions as a display unit that displays information and as a reception unit that receives an instruction from a user. Various screens provided by the OS 300, the application 200, the printer driver 500, and the like are displayed on the operation unit 116. The user performs a touch operation using an object, such as a finger, on the operation unit 116, to input a desired operation instruction to the information processing apparatus 101. The operation unit 116 is also provided with hardware keys. The user can also input an operation instruction to the information processing apparatus 101 by pressing the hardware keys.

The communication I/F 123 is an interface that connects a peripheral apparatus, such as the printing apparatus 102, to the information processing apparatus 101 to communicate with each other. As described above with reference to FIG. 1, the communication IF 123 for communicating with the printing apparatus 102 may be a wired connection via a USB, a local area network (LAN), or the like, or may be a wireless connection.

<Software Configuration of Information Processing Apparatus 101>

Figure 3:
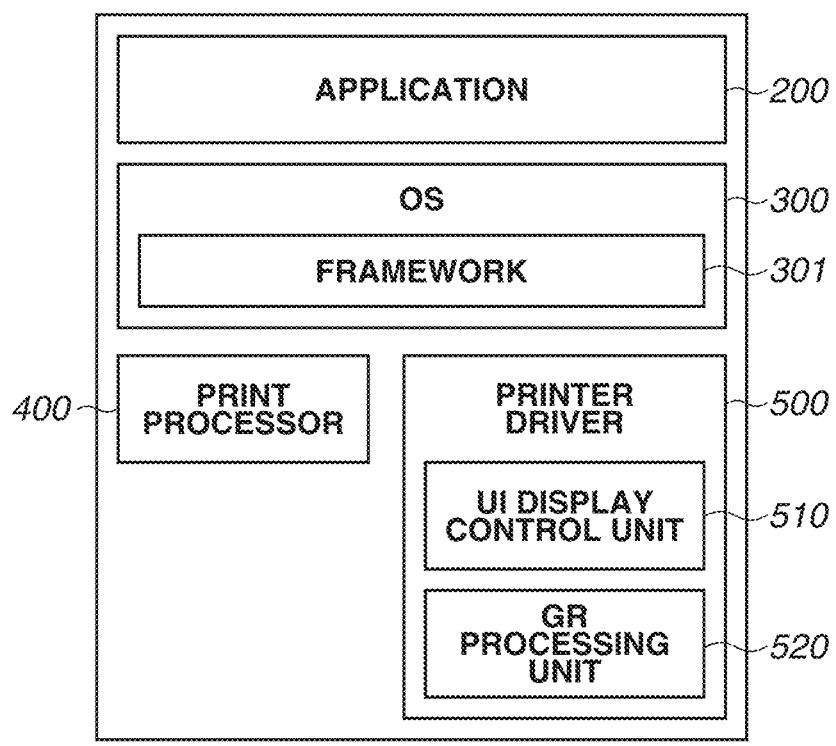
FIG. 3 is a block diagram illustrating a software configuration example of the information processing apparatus.

Next, a software configuration example of the information processing apparatus 101 will be described with reference to FIG. 3. FIG. 3 is a block diagram illustrating software functions which is implemented by the CPU 111 reading out control programs stored in the ROM 112 and the storage 114.

The OS 300 is basic software for controlling the overall operation of the information processing apparatus 101. The OS 300 is composed of, for example, Windows® provided by Microsoft Corporation. The OS 300 includes a framework 301 that supports data output to a display and a printer from applications such as the application 200. The framework 301 includes a graphic device interface (GDI) and a spooler.

The application 200 is an application program installed in the information processing apparatus 101. For convenience of explanation, a word processor application for creating documents is installed in the information processing apparatus 101 in the present exemplary embodiment. The word processor application includes a function for creating document data based on a user input. Further, the application 200 includes a function for generating rendering data for printing in cooperation with the framework 301 of the OS 300. When the OS 300 detects that a printing instruction is executed from an application menu or the like, a print dialog (not illustrated) is displayed. The user can select, from the print dialog, a printer to which data is output, and can call a detailed print setting screen of the printer driver 500 to change print settings.

The printer driver 500 and the print processor 400 that is used to generate print data to be transmitted to the printing apparatus 102 are also installed in the information processing apparatus 101. The printer driver 500 includes a user interface (UI) display control unit 510 and a graphics rendering (GR) processing unit 520.

The print processor 400 and the printer driver 500 are installed by the user using an installation package (not illustrated). Upon detecting a user instruction to install the printer driver 500 into the information processing apparatus 101, an installer included in the installation package installs the printer driver 500 into the information processing apparatus 101. Upon completion of the installation, a print processor to be associated with the printer driver 500 is replaced with the print processor 400.

The UI display control unit 510 provides a print setting screen. FIG. 4 illustrates an example of the print setting screen which is displayed on the operation unit 116 by the UI display control unit 510. The user can enter settings for the number of copies, orientation of printing, stapling processing for stapling a print product, and the like using the print setting screen.

A display item 401 to be displayed on the print setting screen is a display item for setting N-in-1 printing for aggregating a plurality of pages on a sheet. The present exemplary embodiment illustrates a case where 2-in-1 printing for allocating two pages to one side of a single sheet by reducing the size of the pages is set. The user can make a setting for N-in-1 printing, such as 1-in-1 printing, 2-in-1 printing, 4-in-1 printing, or 16-in-1 printing, using the display item 401. The user can also make a setting for saddle stitch bookbinding or center-folding bookbinding using the display item 402. In the case of saddle stitch bookbinding or center-folding bookbinding printing, rendering data corresponding to two pages is allocated to a single sheet.

A display item 403 is a display item for setting an output sheet size. A display item 404 is used for setting a size of data to be input from an application. Depending on a combination of the display items 403 and 404, there may be a case where rendering data corresponding to one page is reduced for printing. For example, in a case where an "A3" size is set in the display item 404 and an "A4" size is set in the display item 403, the rendering data is reduced by 70% so that A3-size data is reduced to A4-size data Upon detecting that an OK button is pressed after the setting is changed using these print setting screens, the UI display control unit 510 updates DEVMODE which is a print setting to be referenced by the printer driver 500, the print processor 400, and the GDI. The term "DEVMODE" refers to a print setting corresponding to (to be associated with) rendering data generated by an application in cooperation with an OS.

Figure 5:
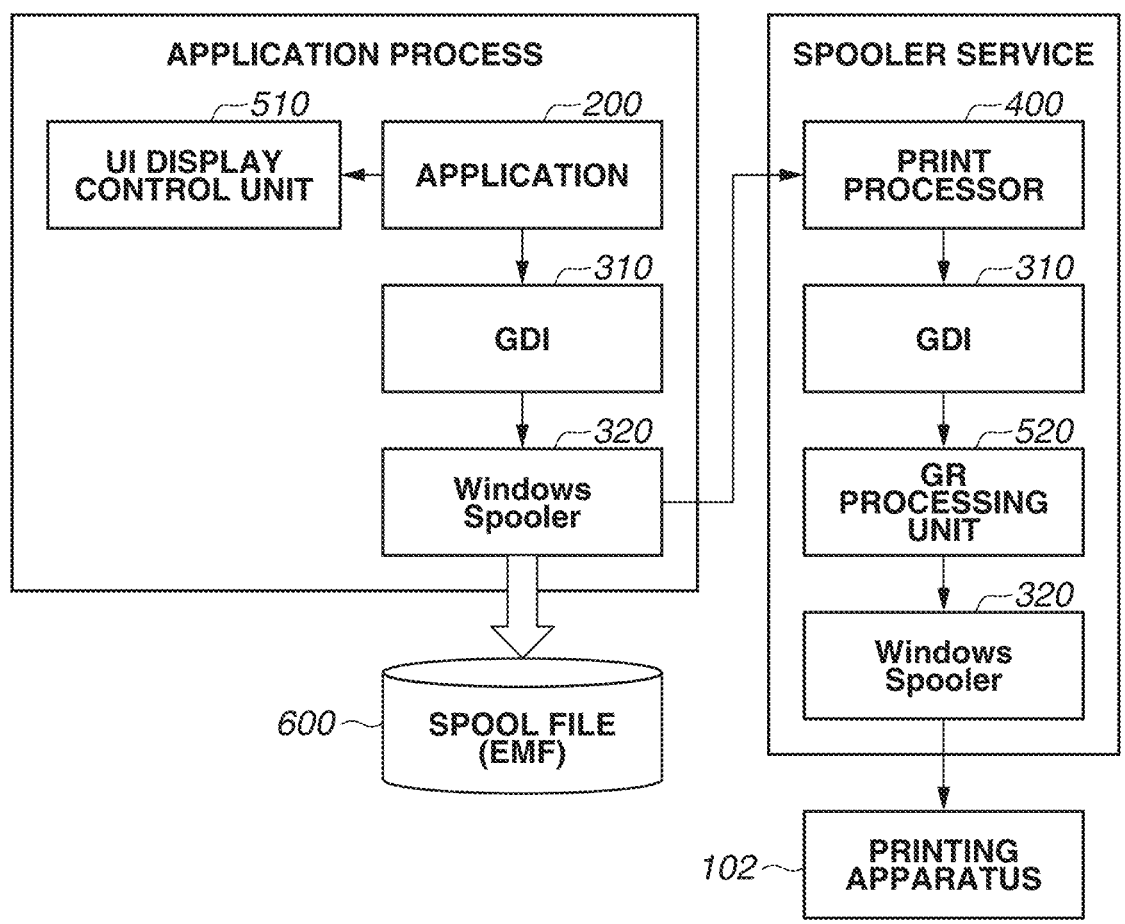
FIG. 5 is a schematic diagram illustrating a print processing procedure.

Next, a printing procedure will be described with reference to FIG. 5. A printing procedure using the print processor 400 will be described with reference to FIG. 5.

A GDI 310 and a spooler 320 are components included in the framework 301 of the OS 300. The GDI 310 provides an application layer with a rendering interface including printing. The spooler 320 performs processing for controlling storage of a spool file (Enhanced Metafile (EMF)) 600 to be described below and transmitting print data (PDL data) generated by the printer driver 500. The term "EMF" refers to an image file format that is used for the OS 300 to transmit intermediate data (abstracted rendering data) to the printer driver 500.

The application 200 calls the UI display control unit 510 of the printer driver 500, as needed, displays the print setting screen illustrated in FIG. 4, and receives a user operation to change the print setting.

After that, upon detecting that a user operation to start printing is performed from a common print dialog or the like, the application 200 calls an application program interface (API) of the GDI 310. If the application program interface (API) is successfully called, the application 200 delivers the print setting and rendering data to the GDI 310.

The GDI 310 stores the print setting and rendering data received from the application 200 in the format of a (EMF) spool file (EMF) 600. After completion of generation of the EMF spool file 600 by the process of the application 200, the process of the application 200 issues a printing request to the print processor 400 in cooperation with the OS 300.

Meanwhile, the print processor 400 loaded into a spooler service loads the print setting and rendering data for each page from the EMF spool file 600 of the spooler 320 upon reception of the printing request. The loaded data for each page is delivered to the printer driver 500 via the GDI 310 and is converted into print data Data for each page to be loaded by the print processor 400 is hereinafter referred to as a logical page.

In the case of outputting page data to the printer driver 500, the print processor 400 according to the present exemplary embodiment can perform layout processing for allocating a plurality of logical pages to one page and enlarging or reducing each page in cooperation with the GDI 310. That is, the print processor 400 includes a function for causing the GDI 310 to perform layout control processing. Further, the print processor 400 can perform layout processing for rotating logical page data. These processes can be implemented by performing a coordinate transformation on each logical page.

The GR processing unit 520 converts the rendering data (rendering instruction), which is received via the GDI 310 as described above, into print data (PDL data) of a format that can be printed by the printing apparatus 102 to which the data is output. Further, the GR processing unit 520 performs, for example, job control command adding processing, and generates a print job including print data and stores the print job in the spooler 320. The print job stored in the spooler 320 is transmitted to the printing apparatus 102 via a port monitor.

<Issues of Reduction Processing Using Print Processor>

Next, issues of layout processing using the print processor 400 will be described with reference to FIG. 6. FIG. 6 is a schematic diagram illustrating an issue that arises when a layout for N-in-1 printing and reduction processing are implemented using the print processor 400.

The present exemplary embodiment illustrates an example where 2-in-1 printing is implemented as N-in-1 printing by the print processor 400 using a coordinate transformation.

A logical page 601 illustrates a first logical page. A logical page 602 illustrates a second logical page. FIG. 6 illustrates an example where a plurality of graphics objects 603 each having a small width (e.g., 1.5 pixels) is arranged in each of the logical pages 601 and 602.

Rendering data 610 is an example of rendering data obtained when the GDI 310 performs a coordinate transformation based on a coordinate transformation instruction from the print processor 400, and the logical page 601 and the logical page 602 are aggregated into one physical page in 2-in-1 printing. This layout for N-in-1 printing enables one logical page to be reduced by about 71%. As a result, some of the widths forming the graphics objects 603 each having a small width become smaller than one pixel. In this case, in the configuration for rendering data into a printer device context by operating the print processor 400 and the GDI 310 in cooperation with each other, rendering of a graphics object having a short side that is less than or equal to a predetermined width (e.g., a width smaller than one pixel) is omitted. As a result, rendering information about the graphics object is lost as indicated by the rendering data 610.

Thus, in the case of using the print processor 400 and the GDI 310 to generate rendering data by reducing each logical page, the width of a graphics object may become smaller than a predetermined size as a result of the reduction. In this case, such an issue that rendering information about an object having a size less than or equal to the predetermined size is lost due to rendering processing by the GDI 310 arises.

If a graphics object is lost from rendering data generated by the operation of the print processor 400 and the GDI 310 in cooperation with each other, PDL data that does not include the graphics object is generated in the subsequent-stage printer driver 500. As a result, such an issue that a print product different from that intended by the user is generated arises.

In view of the above-described issues, according to the present exemplary embodiment, the print processor 400 performs layout processing in which reduction processing is not included, and the printer driver 500 executes the reduction processing on laid-out rendering data by taking into consideration the width of each object, thereby control is performed to prevent objects from being lost. A specific mechanism will be described below.

Figure 7:
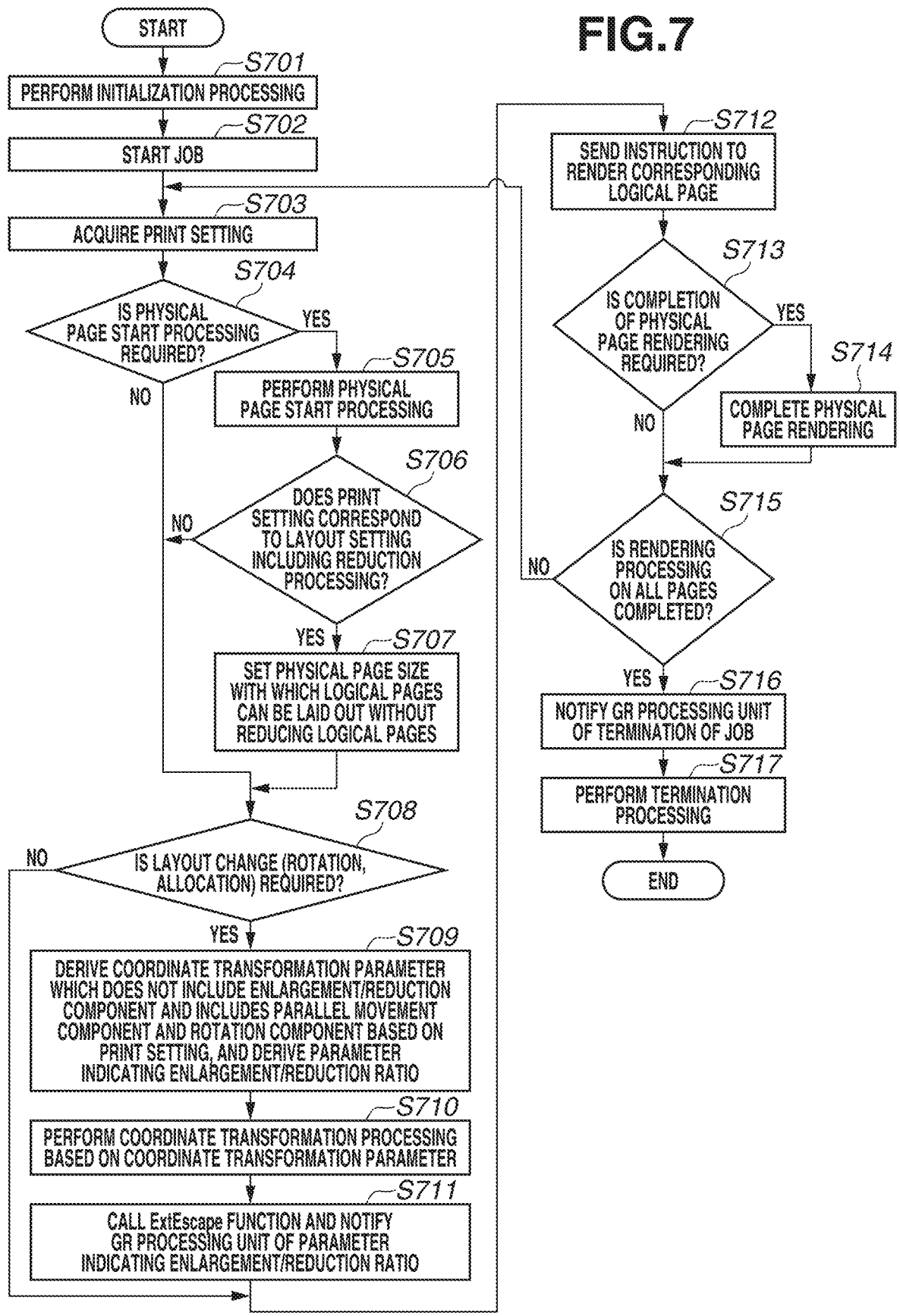
FIG. 7 is a flowchart illustrating an example of layout processing by a print processor.

FIG. 7 is a flowchart illustrating processing by the print processor 400 according to the present exemplary embodiment. Processing by the print processor 400 according to the present exemplary embodiment will be described with reference to FIG. 7.

Figure 8:
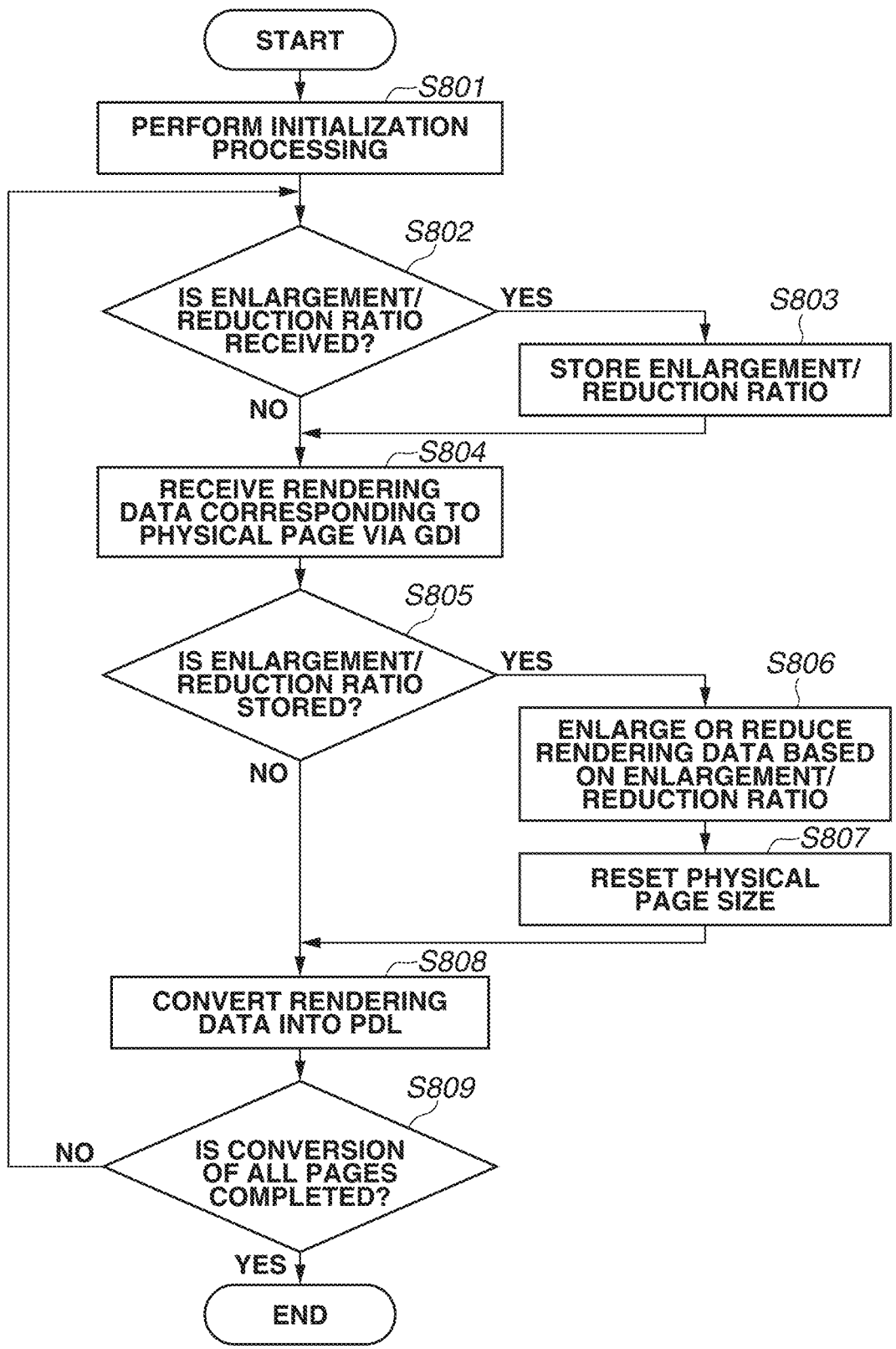
FIG. 8 is a flowchart illustrating an example of print data generation processing by a printer driver.

Each operation (processing procedure) illustrated in the flowchart of FIG. 7 is implemented by the CPU 111 reading out programs stored in the storage 114 into the RAM 113 and executing the programs. In the present exemplary embodiment, each process illustrated in the flowchart is implemented by operation of the print processor 400 and the GDI 310 in cooperation with each other. The following description is made with a software component, an application, and the like as the subjects, respectively, to make clear the program for implementing each process. A flowchart illustrated in FIG. 8 is started when a printing request is issued in the process of the application 200 to the print processor 400 after a printing instruction is input from the application 200 and the EMF spool file 600 is generated.

In step S701, the print processor 400 is loaded into the spooler service by the OS 300 and initialization processing (initial setting processing) is performed. After completion of the initialization processing, the processing proceeds to step S702.

In step S702, the print processor 400 calls the API of the GDI 310 and starts a rendering data conversion job. Then, in step S703, the print processor 400 calls the API of the GDI 310 and acquires a print setting designated by the application 200.

In step S704, the print processor 400 determines whether physical page start processing is required. This processing will be described in detail. For example, on the second logical page in 2-in-1 printing, the physical page is already started in the processing on the first logical page, and thus there is no need to start a new physical page. Meanwhile, on the first or third logical page in 2-in-1 printing, there is a need to declare the start of the physical page. The print processor 400 determines whether the physical page start processing is required in consideration of the print setting acquired in step S703 and the page number of processed (converted) logical pages (the number of processed pages). In a case where it is determined that the physical page start processing is required (YES in step S704), the processing proceeds to step S705.

In step S705, the print processor 400 notifies the GR processing unit 520 of the start of the physical page via the API of the GDI 310.

In step S706, the print processor 400 determines whether the print setting corresponds to a layout setting including reduction processing, based on the print setting acquired in step S703. In a case where it is determined that the print setting corresponds to the layout setting including reduction processing (YES in step S706), the processing proceeds to step S707. In a case where it is determined that the print setting does not correspond to the layout setting including reduction processing (NO in step S706), the processing proceeds to step S708.

For example, when N-in-1 printing is set, the print setting corresponds to the layout setting including reduction processing. Also, when a setting for saddle stitch bookbinding or center-folding bookbinding is made, the print setting corresponds to the layout setting including reduction processing. Further, in a case where rendering data corresponding to one page is to be reduced depending on a combination of a setting in the display item 403 for the document size and a setting in the display item 404 for the output page size as illustrated in FIG. 4, the print setting corresponds to the layout setting including reduction processing. Furthermore, in a case where logical pages are arranged by reducing the logical pages depending on a combination of N-in-1 printing, the display item 403, the display item 404, and the like, the print setting corresponds to the layout setting including reduction processing.

In step S707, the print processor 400 sets a physical page size in which logical pages can be laid out without reducing the logical pages in the subsequent layout processing. For example, when 2-in-1 printing is set as N-in-1 printing on an A4-sheet, the physical page size is changed from the "A4" size to the "A3" size. When 4-in-1 printing is set as N-in-1 printing on an A4-sheet, the physical page size is changed from the "A4" size to an "A2" size.

In step S708, the print processor 400 determines whether a layout change, such as rotation, movement, or enlargement/reduction, is required based on the print setting acquired in step S703. In a case where it is determined that the layout change is required (YES in step S708), the processing proceeds to step S709. In a case where it is determined that the layout change is not required (NO in step S708), the processing proceeds to step S712.

In step S709, the print processor 400 derives a coordinate transformation parameter that does not include any enlargement/reduction component and includes a parallel movement component and a rotation component, based on the print setting acquired in step S703. Further, the print processor 400 derives a parameter that indicates an enlargement/reduction ratio (a scaling ratio indicating an enlargement ratio or a reduction ratio) and is used to enlarge or reduce rendering data subjected to the coordinate transformation, based on the coordinate transformation parameter.

The print processor 400 calculates six coordinate transformation parameters and the enlargement/reduction ratio described above in consideration of the layout setting, such as enlargement/reduction or N-in-1 printing, the size of a target logical page, the size of a physical page to be output, a sheet feeding direction (SEF, LEF), and the like.

In step S710, the print processor 400 issues a coordinate transformation instruction to the GDI 310 based on the coordinate transformation parameter that does not include any enlargement/reduction component and includes a parallel movement component and a rotation component as derived in step S709. The GDI 310 performs a coordinate transformation of a rotation (Rx, Ry) and a parallel movement (Tx, Ty) on one logical page, based on the coordinate transformation instruction. Specifically, the print processor 400 calls a SetWorldTransform function which is an API of the GDI 310. Coordinate transformation parameters used to convert coordinates (x, y) into coordinates (x', y') are designated as arguments of the SetWorldTransform function provided by the GDI 310. Specifically, the print processor 400 sets six coordinate transformation parameters eM11, eM12, eM21, eM22, eDx, and eDy included in the following Expressions (1) and (2) as arguments.

$$x' = x*eM11 + y*eM21 + eDx \quad (1)$$

$$y' = x*eM21 + y*eM22 + eDy \quad (2)$$

Expressions (1) and (2) are so-called affine transformation expressions for performing linear mapping (enlargement, reduction, movement, rotation, skewing, etc.) including a parallel movement on a graphics object.

Next, in step S711, the print processor 400 calls an ExtEscape function, which is an API of the GDI 310, and notifies the GR processing unit 520 of the enlargement/reduction ratio derived in step S709.

The ExtEscape function will now be briefly described. The ExtEscape function is an application programming interface (API) of the GDI 310 that enables direct transfer of data to the printer driver 500 from an application or the like. An escape ID value, an input data structure, and an output data structure are arranged between a caller and a receiver. The caller, such as an application, calls the ExtEscape function and the receiver which is the GR processing unit 520 of the printer driver 500 receives the ExtEscape function. The caller, such as an application, for calling the ExtEscape function designates information indicating an area for storing input data and output data as arguments together with the predetermined escape ID value, to call the ExtEscape function.

When the ExtEscape function in which the predetermined escape ID value is designated is called, a notification is issued to the GR processing unit 520 of the printer driver 500 via the GDI 310. The GR processing unit 520 of the printer driver 500 reads a content of the input data to thereby directly receive data from a caller, and stores output data to thereby return data to the caller.

Referring again to FIG. 7, in step S711, the print processor 400 calls the ExtEscape function in which the escape ID value and the enlargement/reduction ratio arranged preliminarily between the print processor 400 and the GR processing unit 520 are designated as arguments. Upon receiving a notification using the ExtEscape function, the GR processing unit 520 can recognize what kind of scaling processing is to be carried out. While, in the present exemplary embodiment, an image scaling ratio is used as an enlargement/reduction ratio, the enlargement/reduction ratio is not limited to this example. For example, coordinate transformation parameters including only enlargement/reduction components may be used. Any data format may be used as long as enlargement/reduction components can be extracted from the data.

By the processing in step S711, a notification about the enlargement/reduction ratio can be sent to the GR processing unit 520 of the printer driver 500.

Next, in step S712, the print processor 400 sends an instruction to render the corresponding logical page to the GDI 310. The GR processing unit 520 receives the rendering instruction via the GDI 310. In this process, each rendering instruction to be sent to the GR processing unit 520 is a rendering instruction (rendering data) including an object on which the coordinate transformation has been executed by the GDI 310 based on the instruction issued in step S710. The GR processing unit 520 performs processing for converting the received rendering instruction into print data (PDL data) that can be processed by the printing apparatus 102. After completion of the rendering instruction on one logical page, the processing proceeds to step S713.

In step S713, the print processor 400 determines whether to complete physical page rendering. For example, in the case of 2-in-1 printing, to process the second or fourth logical page, rendering of the corresponding physical page needs to be completed. Accordingly, the print processor 400 determines that rendering of the physical page needs to be completed. The print processor 400 determines whether rendering of physical page needs to be completed in consideration of the print setting acquired in step S703 and the page number of processed (converted) logical pages. In a case where the print processor 400 determines that completion of the physical page rendering is required (YES in step S713), the processing proceeds to step S714. In a case where the print processor 400 determines that completion of the physical page rendering is not required (i.e., there is a need to perform logical page rendering processing on the same physical page) (NO in step S713), the processing proceeds to step S715.

In step S714, the print processor 400 notifies the GR processing unit 520 of the end of physical page rendering processing via the API of the GDI 310. Upon completion of the notification, the processing proceeds to step S715.

In step S715, the print processor 400 determines whether the rendering processing on all logical pages within the EMF spool file 600 is completed. In a case where the rendering processing on all logical pages is completed (YES in step S715), the processing proceeds to step S716. In a case where the rendering processing on all logical pages is not completed (there is an unprocessed logical page) (NO in step S715), the processing returns to step S703 to perform processing on the subsequent logical page.

In step S716, the print processor 400 notifies the GR processing unit 520 of termination of the job via the API of the GDI 310. After completion of the processing described above, in step S717, the print processor 400 performs termination processing to terminate a series of rendering data generation processing.

Next, physical page scaling processing and print data (PDL data) generation processing to be performed by the printer driver 500 will be described with reference to FIG. 8.

FIG. 8 is a flowchart illustrating an example of processing to be performed by the GR processing unit 520 according to the present exemplary embodiment. The processing according to the present exemplary embodiment will be described with reference to FIG. 8. Each operation (processing procedure) illustrated in the flowchart of FIG. 8 is implemented by the CPU 111 reading out programs stored in the storage 114 into the RAM 113 and executing the programs. Each process illustrated in the flowchart is implemented by the operation of the GR processing unit 520 and the GDI 310 in cooperation with each other. The following description is made with a software component, an application, and the like as the subjects, respectively, to make clear the program for implementing each process. The flowchart illustrated in FIG. 8 is started when a printing instruction is issued from the application 200.

In step S801, the GR processing unit 520 performs appropriate initialization processing, including processing for starting a job and receiving a print setting.

In step S802, the GR processing unit 520 determines whether a notification about an image enlargement/reduction ratio is received from the print processor 400. In a case where the GR processing unit 520 receives data in which the predetermined escape ID value is designated based on the ExtEscape function, the GR processing unit 520 determines that the notification about the enlargement/reduction ratio is received (YES in step S802), and then the processing proceeds to step S803. In a case where the data in which the predetermined escape ID value is designated based on the ExtEscape function is not received, the GR processing unit 520 determines that the notification about the enlargement/reduction ratio is not received (NO in step S803), and then the processing proceeds to step S804.

In step S803, the GR processing unit 520 temporarily stores the received enlargement/reduction ratio together with the predetermined escape ID value in the RAM 113.

In step S804, the GR processing unit 520 receives a series of rendering data corresponding to one physical page via the GDI 310. Specifically, the GR processing unit 520 receives rendering data via the GDI 310 during a period from the reception of a physical page start instruction to the reception of a physical page end instruction, and temporarily stores the received rendering data.

In step S805, the GR processing unit 520 determines whether the enlargement/reduction ratio is stored in the RAM 113. In a case where the enlargement/reduction ratio is stored in the RAM 113 (YES in step S805), the processing proceeds to step S806. In a case where the enlargement/reduction ratio is not stored in the RAM 113 (NO in step S805), the processing proceeds to step S808.

In step S806, the GR processing unit 520 performs rendering data enlargement or reduction processing based on the enlargement/reduction ratio temporarily stored in step S803. If the enlargement/reduction ratio is a parameter indicating reduction of an image, reduction processing is performed on the image. Meanwhile, if the enlargement/reduction ratio is a parameter indicating enlargement of an image, enlargement processing is performed on the image.

The GR processing unit 520 analyzes each rendering instruction within a physical page, and executes reduction processing on each object. In a case where the GR processing unit 520 performs reduction processing on a graphics object and the graphics object has a short side that is less than or equal to a predetermined width (e.g., a width less than or equal to one pixel), the GR processing unit 520 performs correction control processing for replacing the width of the graphics object with a predetermined value (e.g., one pixel). Accordingly, the reduction processing prevents the size of a graphics object from being reduced to a pixel less than or equal to the predetermined value. Therefore, it is possible to prevent the graphics object from being lost due to the rendering processing.

In step S807, the GR processing unit 520 resets the physical page size in association with enlargement/reduction processing. For example, in the case of setting 2-in-1 printing as N-in-1 printing on an A4-sheet, the physical page size is changed to the "A3" size by the processing of step S707 executed by the print processor 400. In this case, the physical page size is reduced based on the reduction ratio and is reset to the "A4" size. In a case where the printer driver 500 performs enlargement processing, the physical page size is not changed by the print processor 400, which eliminates the need for size change processing. After size change processing is performed, as needed, the GR processing unit 520 deletes the temporarily stored enlargement/reduction ratio from the RAM 113, and then the processing proceeds to step S808.

In step S808, the GR processing unit 520 converts the received rendering data, or rendering data subjected to scaling processing, such as enlargement or reduction processing, after being received, into PDL data that can be interpreted by the printing apparatus 102. For example, the GR processing unit 520 can convert rendering data into PDL data of a format such as Printer Command Language (PCL), Refined Printing Command Stream (RPCS), or Ultra Fast Rendering (UFR). The GR processing unit 520 can also convert rendering data into data of a format such as Post Script (PS) Advanced Rendering Tools (ART) or Sharp Printer Description Language2 (SPDL2). Upon completion of the conversion, the processing proceeds to step S809.

In step S809, the GR processing unit 520 determines whether the conversion of all pages is completed. In a case where a job termination notification is received via the GDI 310, the GR processing unit 520 determines that the conversion of all pages is completed (YES in step S809) and terminates a series of processing. Meanwhile, in a case where the job termination notification is not received via the GDI 310 (NO in step S809), the processing returns to step S802 to wait for reception of another rendering data.

Upon completion of a series of conversion processing, the GR processing unit 520 performs, for example, job control command adding processing, and generates a print job including print data. The generated print job is stored in the spooler 320. The print job stored in the spooler 320 is transmitted to the printing apparatus 102 via the port monitor.

As described above, in the processing illustrated in FIG. 7, the print processor 400 executes layout processing excluding reduction processing. Further, in the processing illustrated in FIG. 8, the printer driver 500 executes the reduction processing by taking into consideration the width of each object, whereby the graphics object can be prevented from being lost.

The exemplary embodiment described above illustrates a configuration in which both the enlargement processing and the reduction processing are executed by the printer driver 500. However, the present disclosure is not limited to this configuration. For example, the enlargement processing may be executed by the print processor 400, and only the reduction processing may be executed by the GR processing unit 520 of the printer driver 500.

The exemplary embodiments and modified examples described above illustrate a configuration in which layout processing, such as rotation or movement, is performed by the print processor 400 in consideration of an operation cost and simplification of processing. However, the present disclosure is not limited to this configuration. For example, in the case of performing printing including reduction processing, the print processor 400 may pass through page data to the GR processing unit 520 via the GDI 310 without performing layout processing. In this case, the subsequent-stage GR processing unit 520 may be configured to acquire a plurality of pieces of page data via the GDI 310 and execute layout processing, such as rotation, movement, or reduction, for each page. In this modified example, layout processing is executed by the print processor 400 in a case where printing is performed without reduction processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-247847, filed Dec. 28, 2018, which is hereby incorporated by reference herein in its entirety.

What is claimed is:

1. An information processing apparatus comprising:
at least one memory storing instructions; and
at least one processor that executes the instructions and configures the at least one processor to operate as a print processor that performs operations including:
receiving a 2-in-1 instruction and rendering data from an application,
causing a Graphics Device Interface (GDI) of an operating system of the information processing apparatus to rotate the rendering data based on the received 2-in-1 instruction without reducing an image size of the rotated rendering data, and
providing to a printer driver, the rotated rendering data with an image size reduction rate that is based on the received 2-in-1 instruction so that the printer driver reduces the image size of the rotated rendering data based on the image size reduction rate.

2. The information processing apparatus according to claim 1, wherein the print processor performs further operations including determining the image size reduction rate based on the received 2-in-1 instruction.

3. The information processing apparatus according to claim 1, wherein receiving includes receiving the 2-in-1 instruction from a user by the printer driver.

4. The information processing apparatus according to claim 3, wherein the print processor performs further operations including receiving, in the print processor, the 2-in-1 instruction from the printer driver via the application.

5. A method for generating print data using a print processor and a printer driver, the method comprising:
receiving, by the print processor, a 2-in-1 instruction and rendering data from an application;
causing a Graphics Device Interface (GDI) of an operating system of the information processing apparatus to rotate the rendering data based on the received 2-in-1 instruction without reducing an image size of the rotated rendering data; and
providing, to the printer driver, the rotated rendering data with an image size reduction rate that is based on the received 2-in-1 instruction so that the printer driver reduces the image size of the rotated rendering data based on the image size reduction rate.

* * * * *